US010616568B1

(12) United States Patent
Lin et al.

(10) Patent No.: US 10,616,568 B1
(45) Date of Patent: Apr. 7, 2020

(54) VIDEO SEE-THROUGH HEAD MOUNTED DISPLAY AND CONTROL METHOD THEREOF

(71) Applicant: Acer Incorporated, New Taipei (TW)

(72) Inventors: Tzu-Chieh Lin, New Taipei (TW); Chao-Shih Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/419,187

(22) Filed: May 22, 2019

(30) Foreign Application Priority Data

Jan. 3, 2019 (TW) .............................. 108100151 A (51) Int. Cl.
*H04N 13/383* (2018.01)
*H04N 13/344* (2018.01)
*H04N 13/00* (2018.01)

(52) U.S. Cl.
CPC ......... *H04N 13/383* (2018.05); *H04N 13/344* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 6,359,601 B1* | 3/2002 | Maguire, Jr. ........... | G06F 3/013 345/7 |
| 9,256,784 B1* | 2/2016 | Taylor ................. | G06K 9/00597 |
| 2004/0010803 A1* | 1/2004 | Berstis ............... | H04N 5/23206 725/105 |
| 2009/0189830 A1* | 7/2009 | Deering .................. | G09G 3/02 345/1.3 |
| 2014/0219551 A1* | 8/2014 | Tang ..................... | G06K 9/4661 382/154 |
| 2014/0285429 A1* | 9/2014 | Simmons ............. | G02B 27/225 345/156 |
| 2017/0078651 A1* | 3/2017 | Russell ............. | G02B 27/0172 |

(Continued)

FOREIGN PATENT DOCUMENTS

TW 201831947 A 9/2018

OTHER PUBLICATIONS

TW Office Action, dated May 8, 2019, 4 pages.
TW Search Report, dated May 27, 2019, 1 page.

*Primary Examiner* — Fernando Alcon
(74) *Attorney, Agent, or Firm* — Edell, Shapiro & Finnan, LLC (57) ABSTRACT

A VST-HMD (Video See-Through Head Mounted Display) includes at least one camera, a first display device, a second display device, a first lens, a second lens, a first eye tracker, a second eye tracker, and a processor. The camera captures environmental image information. The first eye tracker detects left-eye motion information of a user. The second eye tracker detects right-eye motion information of the user. The processor determines an eye focus region of the user and depth information of the eye focus region according to the environmental image information, the left-eye motion information, and the right-eye motion information. The processor further monitors a displacement of the eye focus region and a change in the depth information, and accordingly determines whether to adjust image positions of the first display device and the second display device and/or focus of the camera.

20 Claims, 7 Drawing Sheets

(56) References Cited

U.S. PATENT DOCUMENTS

| | | | |
|---|---|---|---|
| 2017/0142398 A1* | 5/2017 | Peterson | H04N 13/128 |
| 2018/0003963 A1* | 1/2018 | Benitez | G02B 27/2264 |
| 2018/0146212 A1* | 5/2018 | Hensler | G06F 3/012 |
| 2019/0041643 A1* | 2/2019 | Chang | G02B 27/0172 |
| 2019/0082170 A1* | 3/2019 | Akahori | G06K 9/00248 |
| 2019/0174125 A1* | 6/2019 | Ninan | H04N 13/383 |
| 2019/0222830 A1* | 7/2019 | Edwin | G02B 27/0093 |
| 2019/0317598 A1* | 10/2019 | Aleem | H04N 13/383 |

\* cited by examiner

VIDEO SEE-THROUGH HEAD MOUNTED DISPLAY AND CONTROL METHOD THEREOF

This application claims the benefit of Taiwan Application Serial No. 108100151, filed Jan. 3, 2019, the subject matter of which is incorporated herein by reference.

TECHNICAL FIELD

Embodiments of the present invention are directed to a Video See-Through Head Mounted Display (VST-HMD) and more specifically to a VST-HMD that can be dynamically adjusted to improve user experience.

BACKGROUND

Head Mounted Display (HMD) technology can be divided into 'Immersive' and 'See-Through'; See-Through Head Mounted Display technology can be further divided into 'Optical See-Through' and 'Video See-Through' implementations. Video See-Through HMD (VST-HMD) can be applied in Virtual Reality (VR), Mixed Reality (MR) and Augmented Reality (AR).

In general, the image watched through VST-HMD is clear enough only in the focus region. That is, if a user watches another region, the watched image may not be clear enough or not similar to the image that would otherwise be seen in the real world. Therefore, there is a need to provide improvements in VST-HMD technology heretofore not addressed by the prior art.

SUMMARY

A method of operating a video see-through head mounted display being worn by a user is disclosed. The method includes capturing, by at least one camera, environmental image information; displaying, on a first display, a first image according to the environmental image information; displaying, on a second display, a second image according to the environmental image information; detecting left eye motion of the user, and generating corresponding left eye motion information; detecting right eye motion of the user, and generating corresponding right eye motion information; determining an eye focus region of the user and depth information of the eye focus region according to the environmental image information, the left eye motion information, and the right eye motion information; and adjusting a position of the first image position on the first display and a position of the second image on the second display according to the eye focus region and the depth information of the eye focus region.

In another embodiment, a video see-through head mounted display (VST-HMD) is disclosed. The VST-HMD includes at least one camera configured to capture environmental image information; a first display configured to display a first image according to the environmental image information; a second display configured to display a second image according to the environmental image information; a first eye tracker configured to detect left eye motion of a user; a second eye tracker configured to detect right eye motion of the user; and a processor configured to: generate left eye motion information based on detected left eye motion from the first eye tracker; generate right eye motion information based on detected right eye motion from the second eye tracker; determine an eye focus region of the user and depth information of the eye focus region according to the environmental image information, the left eye motion information, and the right eye motion information; and adjust a position of the first image position on the first display and a position of the second image on the second display according to a displacement of the eye focus region and a variation of the depth information of the eye focus region.

BRIEF DESCRIPTION OF THE DRAWINGS

Embodiments are described herein in conjunction with the accompanying drawings, in which.

DESCRIPTION OF EXAMPLE EMBODIMENTS

Figure 1:
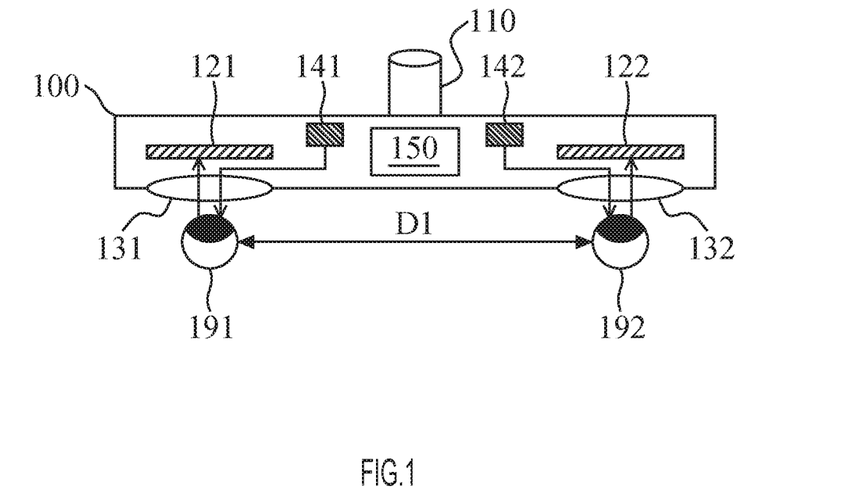
FIG. 1 shows a schematic diagram of a VST-HMD according to an embodiment of the invention.

FIG. 1 shows a schematic diagram of a VST-HMD 100 according to an embodiment of the invention. The VST-HMD 100 can interact with a user. In the embodiment of FIG. 1, VST-HMD 100 includes a camera 110, a first display device 121, a second display device 122, a first lens 131, a second lens 132, a first eye tracker 141, a second eye tracker 142 and a processor 150. Those having ordinary skill in the art will appreciate that the VST-HMD 100 may further include additional components such as a speaker, a power supply module, and a housing, even though such components are not shown in FIG. 1.

Figure 2:
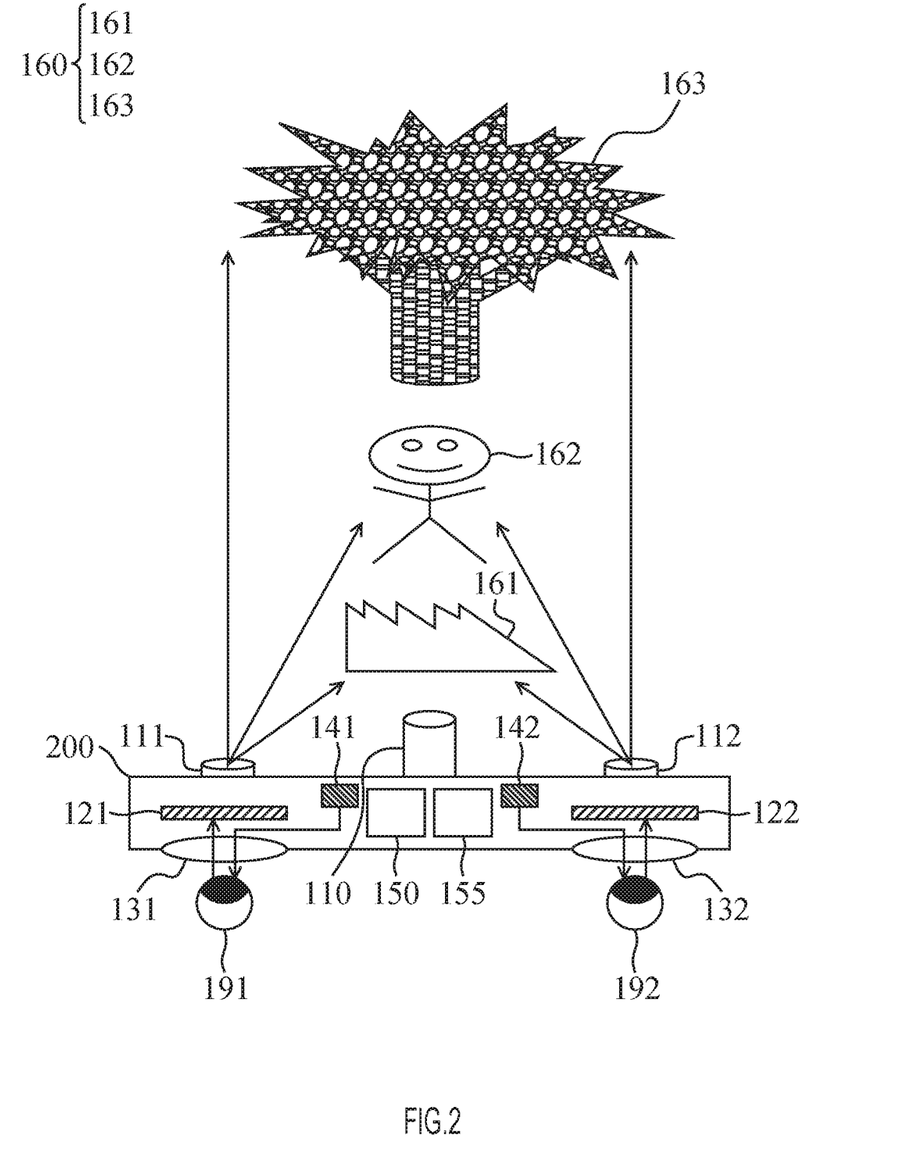
FIG. 2 shows a schematic diagram of a VST-HMD according to another embodiment of the invention.

The camera 110 is used to capture environmental image information 160 (as shown in FIG. 2). For example, environmental image information 160 can be a scene image or a 360 degree image. When the user puts on the VST-HMD 100, the first display 121 and the first lens 131 are aligned with a left eye 191 of the user, and the second display 122 and the second lens 132 are aligned with a right eye 192 of the user. Therefore, the left eye 191 of the user can watch the first display 121 through the first lens 131, and the right eye 192 of the user can watch the second display 122 through the second lens 132. The first display 121 and the second display 122 can display an image according to the environmental image information 160 captured by the camera 110, enabling the user who views the scene through the VST-HMD 100 to an immersive visual experience.

The first eye tracker 141 can be used to track the left eye 191 and to detect left-eye motion and generate corresponding left-eye motion information. The second eye tracker 142 can be used to track the right eye 192 and to detect right-eye motion and generate corresponding right-eye motion information. For example, the left-eye motion information can include a turning direction of the left eye 191 and a turning angle of the left eye. The right-eye motion information can include a turning direction of the right eye 192 and a turning angle of the right eye. It is noted that the right- and left-eye motion information need not be limited to the foregoing parameters. In general, the processor 150 appropriately controls the first display 121 and the second display 122 according to a result returned by the camera 110, the first eye tracker 141 and the second eye tracker 142 to optimize the user experience.

The details set forth below describe the principles of operation of the VST-HMD of the invention. Those having ordinary skill in the art will appreciate that that the figures and description are presented by way of example and are not to be construed as limitations of the invention.

FIG. 2 shows a schematic diagram of a VST-HMD according to another embodiment of the invention. FIG. 2 is similar to FIG. 1. In the embodiment of FIG. 2, VST-HMD 200 includes the first camera 111, the second camera 112, the first display device 121, the second display device 122, the first lens 131, the second lens 132, the first eye tracker 141, the second eye tracker 142 and the processor 150. The environmental image information 160 captured by the first camera 111 is transmitted to the first display 121, and the environmental image information 160 captured by the second camera 112 is transmitted to the second display 122. That is, the first camera 111 can be a virtual left eye and the second camera 112 can be a virtual right eye. The VST-HMD 200 with dual cameras, compared with that with a single camera, can let the user view a more stereoscopic image. The environmental image information 160 corresponding to different distances from the user includes a near-scene 161, a middle-scene 162 and a far-scene 163. In some embodiments, the focal lengths of the first camera 111 and that of the second camera 112 are fixed. In other embodiments, the focal lengths of the first camera 111 and that of the second camera 112 are variable, and by properly controlling the focus settings, the first camera 111 and the second camera 112 can more accurately capture the environmental image information such as the near-scene 161, the middle-scene 162 and the far-scene 163.

Figure 3:
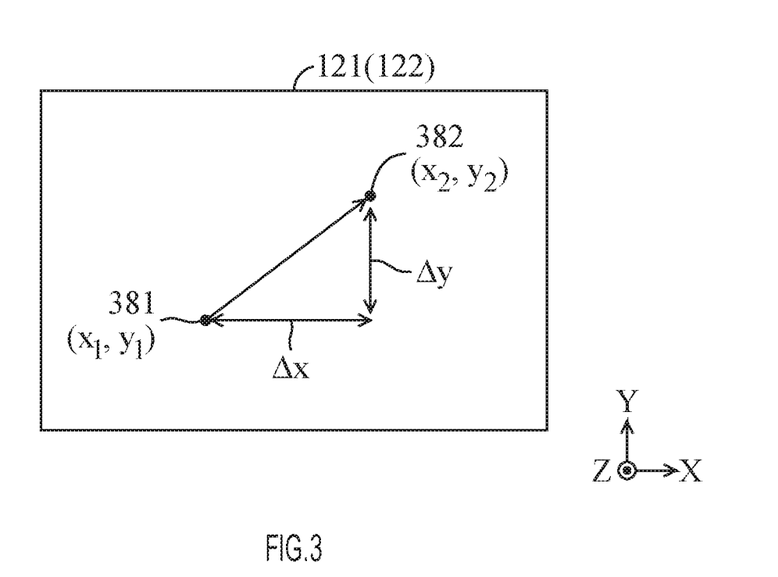
FIG. 3 shows a schematic diagram of an eye focus region according to an embodiment of the invention.

FIG. 3 shows a schematic diagram of an eye focus region according to an embodiment of the invention. By analyzing the left-eye motion information and the right-eye motion information, the processor 150 can determine an Eye Focus Region of the user. Taking the left-eye motion information as an example, the user's left eye 191 can initially look at the first eye focus point 381 on the first display 121. Then, since the environmental image information 160 may change, the user's left eye 191 may focus on the second eye focus point 382 instead of the original first eye focus point 381. At this time, the displacement-A of the eye focus region can be described by the following equations (1), (2), and (3).

$$\Delta x = x_2 - x_1 \quad (1)$$

$$\Delta y = y_2 - y_1 \quad (2)$$

$$A = \sqrt{(\Delta x)^2 + (\Delta y)^2} \quad (3)$$

In FIG. 3, "$(x_1, y_1)$" represents the position coordinate of the first eye focus point 381; "$(x_2, y_2)$" represents the position coordinate of the second eye focus point 382; "$\Delta x$" represents an x-component of the displacement of the eye focus region; "$\Delta y$" represents a y-component of the displacement of the eye focus region; and "A" represents the displacement-A of the eye focus region.

Furthermore, the processor 150 can obtain Depth Information of the Eye Focus Region based on the environmental image information 160 because the environmental image information 160 can be divided into 'the near-scene 161', 'the middle-scene 162' and 'the far-scene 163'. For example, if the first eye focus point 381 is the near-scene 161, the Depth Information may be considered relatively lower; if the second eye focus point 382 is the far-scene 163, the Depth Information may be considered relatively higher. The scene depth is proportional to the distance between the user and the scene. Therefore, there is a depth information variation B between the first eye focus point 381 and the second eye focus point 382. The depth information variation B can be described by the following equations (4) and (5):

$$\Delta z = z_2 - z_1 \quad (4)$$

$$B = |\Delta z| \quad (5)$$

In the foregoing equations, "$z_1$" represents the scene depth of the first eye focus point 381; "$z_2$" represents the scene depth of the second eye focus point 382; "$\Delta z$", which is the scene depth variation of the eye focus region, represents the z-component of the eye focus region; and "B" represents the depth information variation.

For the above mentioned parameters, the position coordinate of the first eye focus point 381 can be regarded as the original eye focus region; the position coordinate of the second eye focus point 382 can be regarded as the eye focus region after shifting; the scene depth of the first eye focus point 381 can be regarded as the original depth information; and the scene depth of the second eye focus point 382 can be regarded as the depth information after changing.

In addition, the processor 150 may also analyze the right-eye motion information of the right eye 192 of the user in a similar manner, although not described expressly herein. Briefly, the eye focus region, the displacement-A of the same, the depth information-B and the variation of the same can be determined (calculated) by the processor 150 according to either the left-eye motion information or the right-eye motion information, or both.

Figure 4:
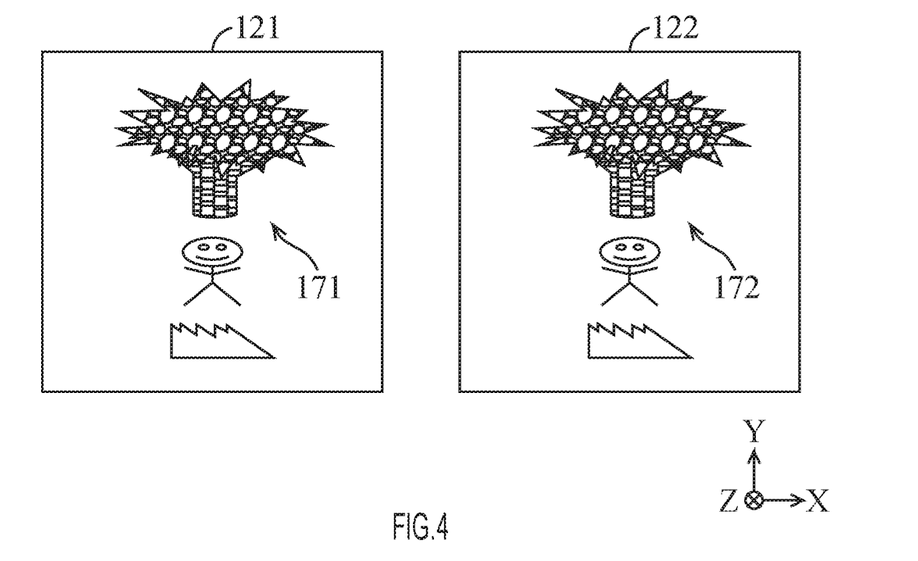
FIG. 4 shows a schematic diagram of a first display and a second display according to an embodiment of the invention.

FIG. 4 shows a schematic diagram of a first display 121 and a second display 122 according to an embodiment of the invention. In the embodiment of FIG. 4, the first display 121 displays the first image 171 according to the environmental image information 160, and the second display 122 displays the second image 172 according to the environmental image information 160. The processor 150 can monitor a displacement A of the eye focus region and the depth information variation B to determine whether to adjust the first image 171 position and the second image 172 position based on the monitored information.

In some embodiments, if the displacement A of the eye focus region is more than a first threshold or the depth information variation B is more than a second threshold, it can be determined that the eye focus region of the user displaced significantly, and at this time, the processor 150 may dynamically adjust the first image 171 position and the second 172 image position (for example, shifting M pixels in the X-axis direction and shifting N pixel in the Y-axis direction; M and N are integers). In other embodiments, if the displacement A of the eye focus region is less than or equal to the first threshold and the depth information variation B is less than or equal to the second threshold, it can be determined that the eye focus region of the user did not displace significantly, and at this time, the processor 150 may not take further action, but rather continue to monitor the displacement A of the eye focus region and the depth information variation B. In accordance with an embodiment, when the eye focus region or the depth information changes significantly, the processor 150 can compensate the disparity between the left-eye image and right-eye image by fine-tuning the position of the first image 171 and the position of the second image 172. Therefore, the user can watch images which are more stereoscopic, and the user experience of the VST-HMD 200 can be improved. It is noted that the addition of the aforementioned first threshold and the second threshold helps to avoid erroneous actions of the processor 150; moreover, such thresholds can stabilize the operation of the VST-HMD 200. In one possible implementation, the aforementioned first threshold and second threshold can be adjusted by the user.

In some embodiments, the VST-HMD 200 further includes a mapping module 155 in which a mapping table can be stored. The mapping module 155 is coupled to the processor 150. The mapping module 155 can access the mapping table according to the displaced eye focus region (which includes the displacement A) and the changed depth information (which includes the variation B) to generate a first setting parameter. The first setting parameter relates to the setting method of the first display 121 and the second display 122. The processor 150 can further dynamically adjust the position of the first image 171 and the position of the second image 172 according to the first setting parameter.

Further, the mapping module 155 can access the mapping table according to the displaced eye focus region (which includes the displacement A) and the changed depth information (which includes the variation B) to generate a second setting parameter. The second setting parameter relates to the setting method of the first camera 111 or (and) the second camera 112. The processor 150 can further dynamically adjust the focus settings of the first camera 111 or (and) the focus settings of the second camera 112 according to the second setting parameter. In this design, when the eye focus region or the depth information changes significantly, the processor 150 can capture the scene information at different distances by fine-tuning the focus settings of the first camera 111 and the focus settings of the second camera 112, enabling the user to watch images which are clearer. For example, when the eye focus region of the user is the near-scene 161, the focal length of the first camera 111 or (and) that of the second camera 112 may be adjusted to become shorter; when the eye focus region of the user is the far-scene 163, the focal length of the first camera 111 or (and) that of the second camera 112 may be adjusted to become longer.

In some embodiments, the first eye tracker 141 and the second eye tracker 142 further detect the user's IPD D1 (interpupillary distance, which is the distance between the pupil center of the left eye 191 and that of the right eye 192). Since faces of different users are different, after considering the parameter, the processor 150 may further adjust the disparity between the left-eye image and right-eye image according to the IPD D1.

A scenario of using the first camera 111 and the second camera 112 at the same time (i.e., using dual cameras as shown in FIG. 2) is described below. The processor 150 can increase the disparity between the left-eye image and right-eye image if the user's IPD D1 is more than the distance between the first camera 111 and the second camera 112. For example, the processor may shift the first image in the positive direction in the X axis, and may shift the second image 172 in the negative direction of the X-axis. On the other hand, if the user's IPD D1 is less than the distance between the first camera 111 and the second camera 112, the processor 150 can decrease the disparity between the left-eye image and right-eye image. For example, the processor 150 may shift the first image 171 in the negative direction of the X-axis and may shift the second image 172 in the positive direction of the X-axis.

On the other hand, if only one of the first camera 111 and the second camera 112 is used (or only the single camera is used as shown in FIG. 1), the processor 150 can perform the following adjustments according to the user's IPD D1. Specifically, if the user's IPD is relatively high, the processor 150 may relatively increase the disparity between the first image 171 and the second image 172. Conversely, if the user's IPD is relatively low, the processor 150 may relatively decrease the disparity between the first image 171 and the second image 172.

In some embodiments, if the eye focus region of the user corresponds to a central region of the first lens 131 or (and) that of the second lens 132, the processor 150 can relatively significantly adjust the first image 171 position and the second image 172 position (for example, the adjusting range is 20%), or (and) relatively significantly adjust the focus settings of the first camera 111 or (and) that of the second camera 112 (for example, the adjusting range is 20%).

In other embodiments, if the eye focus region of the user corresponds to a boundary region of the first lens 131 or (and) that of the second lens 132, the processor 150 can relatively slightly adjust the first image 171 position and the second image 172 position (for example, the adjusting range is 10%), or (and) relatively slightly adjust the focus settings of the first camera 111 or (and) that of the second camera 112 (for example, the adjusting range is 10%). The aforementioned settings are due to the fact that the image corresponding to the central region of the lens is relatively clear, and the image corresponding to the boundary region of the lens may be relatively blurred. Therefore, considering the characteristic at different regions of the lens, the processor 150 can further improve stereoscopic vision perception for users.

Figure 5:
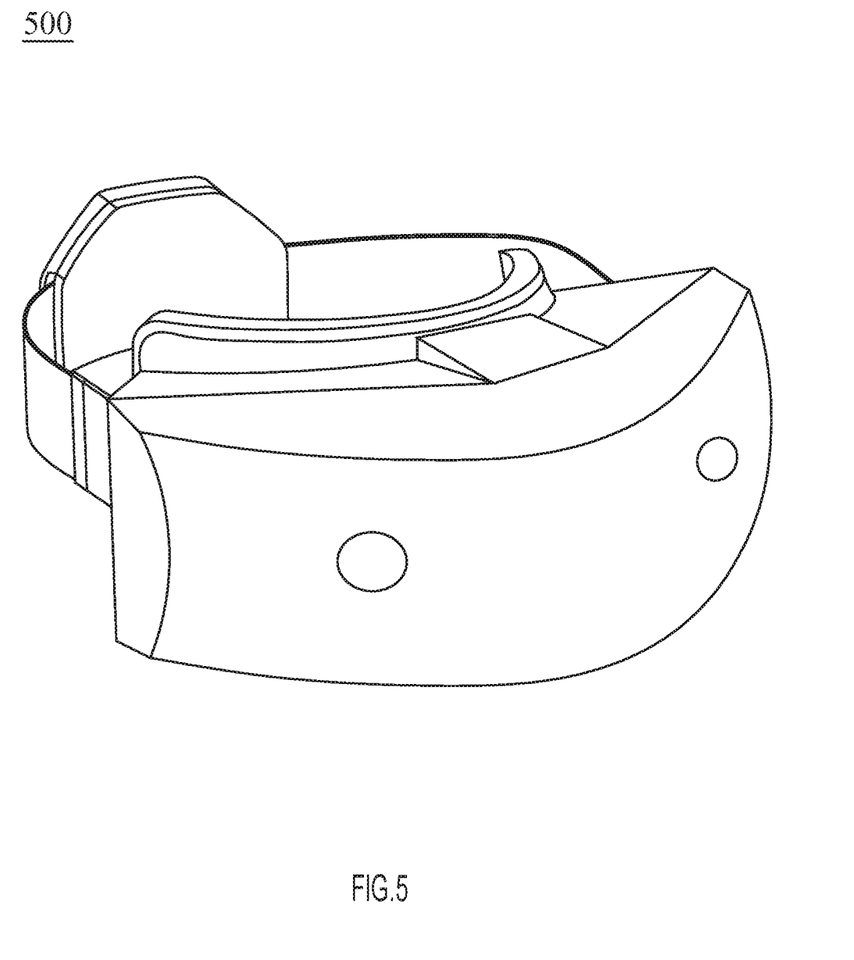
FIG. 5 shows a perspective view of a VST-HMD according to an embodiment of the invention.

FIG. 5 shows a perspective view of a VST-HMD according to an embodiment of the invention. The VST-HMD 500 of FIG. 5 may be regarded as an actual implementation of commercial product. However, the shape and type of the VST-HMD 500 should not be construed as limiting the present invention in that the shape and dimensions of the apparatus can be changed and adjusted according to different needs.

Figure 6:
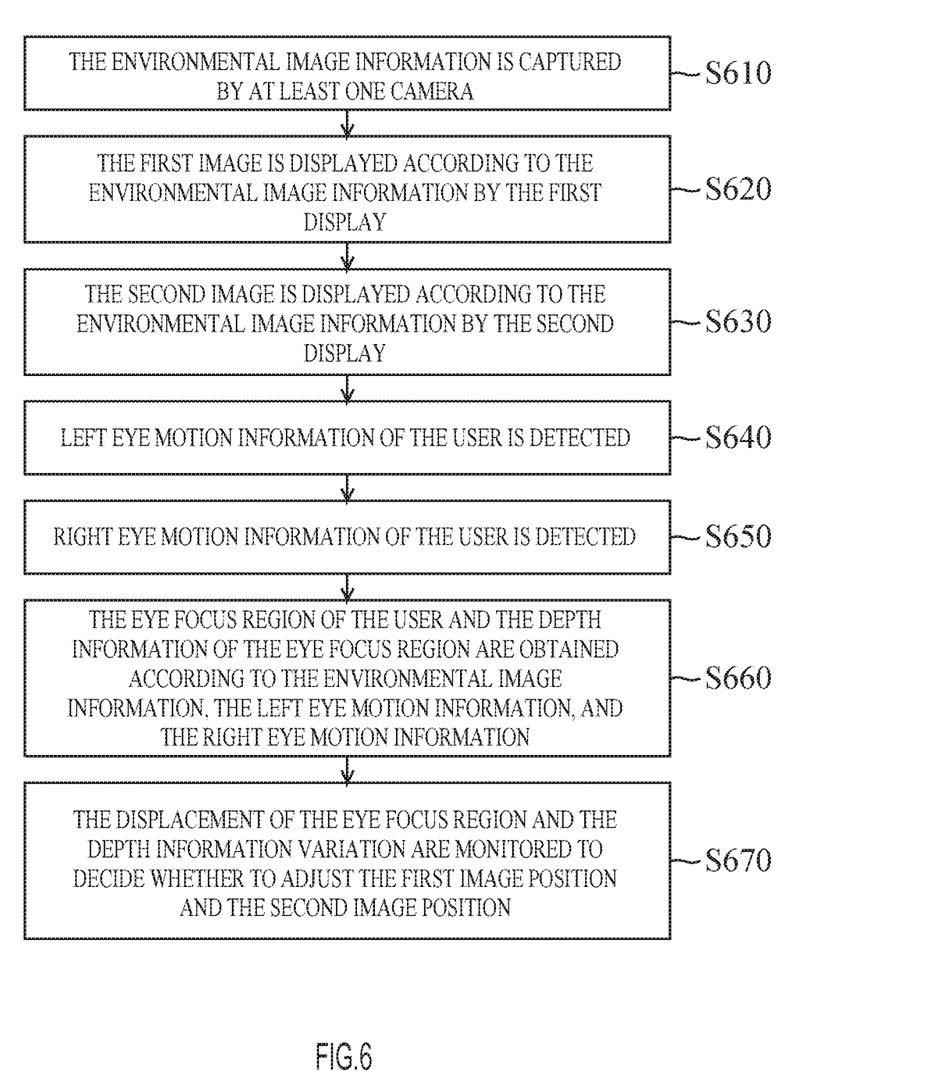
FIG. 6 is a flowchart showing a series of operations for controlling a VST-HMD according to an embodiment of the invention.

FIG. 6 is a flowchart showing a series of operations for controlling a VST-HMD according to an embodiment of the invention. In the embodiment of FIG. 6, the control method includes the following steps. First, in step S610, the environmental image information is captured by at least one camera. In step S620, the first image is displayed according to the environmental image information by the first display. In step S630, the second image is displayed according to the environmental image information by the second display. In step S640, left eye motion information of the user is detected. In step S650, right eye motion information of the user is detected. In step S660, the eye focus region of the user and the depth information of the eye focus region are obtained according to the environmental image information, the left eye motion information, and the right eye motion information. In step S670, the displacement of the eye focus region and the depth information variation are monitored to decide whether to adjust the first image position and the second image position.

Figure 7:
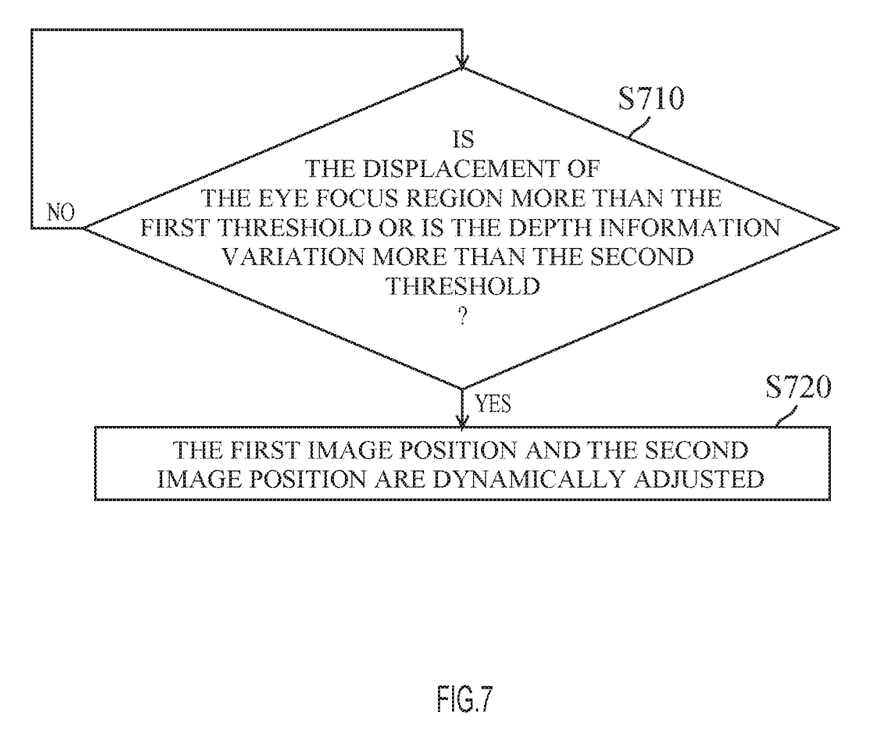
FIGS. 7-9 are flowcharts showing, respectively, additional operations for controlling a VST-HMD according to an embodiment of the invention.
Figure 8:
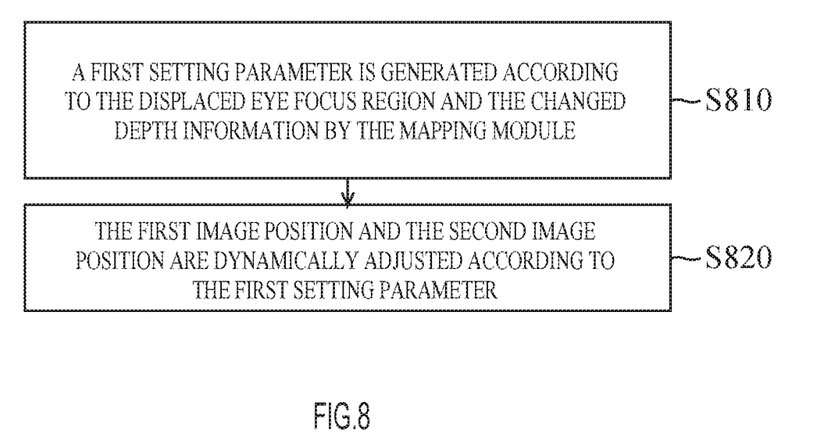
Figure 9:
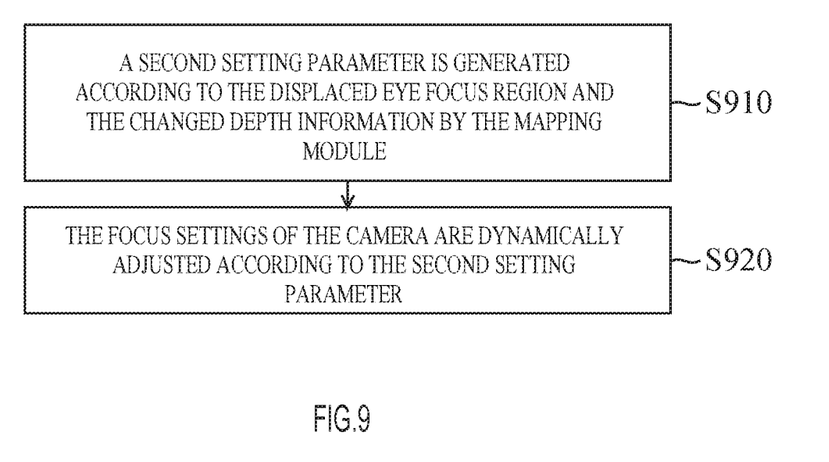

FIGS. 7-9 are flowcharts showing, respectively, additional operations for controlling a VST-HMD according to an embodiment of the invention.

In the flowchart of FIG. 7, the aforementioned step S670 further includes the following steps. In step S710, it is determined whether the displacement of the eye focus region is more than the first threshold or the depth information variation is more than the second threshold. If not, the program returns to step S710 and continuously monitors the displacement of the eye focus region and the depth information variation. If yes, in step S720, the first image position and the second image position are dynamically adjusted.

In the flowchart of FIG. 8, the aforementioned step S720 further includes the following steps. In step S810, a first setting parameter is generated according to the displaced eye focus region and the changed depth information by the mapping module. In step S820, the first image position and the second image position are dynamically adjusted according to the first setting parameter.

In the flowchart of FIG. 9, the aforementioned step S720 further includes the following steps. In step S910, a second setting parameter is generated according to the displaced eye focus region and the changed depth information by the mapping module. In step S920, the focus settings of the camera are dynamically adjusted according to the second setting parameter In some embodiments, the control method of the VST-HMD further includes detecting the user's IPD and adjusting the disparity between the first image and second image according to the IPD.

It should be noted that the above-described steps need not be performed sequentially, and all device features of the VST-HMD 100, 200, 500 can be controlled in accordance with the control methods described in connection with FIGS. 6-9.

The present invention provides a novel VST-HMD that implements dynamic optimization techniques based on a user's eye characteristic parameters. These techniques provide a clearer image for the user, and effectively improve stereoscopic vision perception, whereby the overall user experience may be improved.

The above description is intended by way of example only.

What is claimed is:

1. A method of operating a video see-through head mounted display being worn by a user, comprising:
    capturing, by at least one camera, environmental image information;
    displaying, on a first display, a first image according to the environmental image information;
    displaying, on a second display, a second image according to the environmental image information;
    detecting left eye motion of the user, and generating corresponding left eye motion information;
    detecting right eye motion of the user, and generating corresponding right eye motion information;
    determining an eye focus region of the user and depth information of the eye focus region according to the environmental image information, the left eye motion information, and the right eye motion information; and
    adjusting a position of the first image position on the first display and a position of the second image on the second display according to the eye focus region and the depth information of the eye focus region.

2. The method of claim 1, further detecting a displacement between a first eye focus region and a second eye focus region, and determining whether the displacement is greater than a first threshold.

3. The method of claim 2, wherein, when the displacement is greater than the first threshold, setting a first setting parameter.

4. The method of claim 3, further comprising obtaining the first setting parameter from a mapping table according to the displacement between the first eye focus region and the second eye focus region.

5. The method of claim 3, further comprising adjusting the position of the first image position on the first display and the position of the second image on the second display according to the first setting parameter.

6. The method of claim 1, further comprising detecting a depth variation between a first a first eye focus region and a second eye focus region, and determining whether the depth variation is greater than a second threshold.

7. The method of claim 6, wherein, when the depth variation is greater than the second threshold, setting a first setting parameter.

8. The method of claim 7, further comprising obtaining the first setting parameter from a mapping table according to the depth variation between the first eye focus region and the second eye focus region.

9. The method of claim 6, further comprising adjusting the position of the first image position on the first display and the position of the second image on the second display according to the first setting parameter.

10. The method of claim 1, further comprising setting a second parameter according to the eye focus region and the depth information of the eye focus region, and adjusting a focus of the at least one camera according to the second parameter.

11. The method of claim 1, further comprising adjusting a position of the first image position on the first display and a position of the second image on the second display according to an interpupillary distance defined by a distance between a pupil center of a left eye of the user and a pupil center of a right eye of the user.

12. A video see-through head mounted display, comprising:
    at least one camera configured to capture environmental image information;
    a first display configured to display a first image according to the environmental image information;
    a second display configured to display a second image according to the environmental image information;
    a first eye tracker configured to detect left eye motion of a user;
    a second eye tracker configured to detect right eye motion of the user;
    and
    a processor configured to:
        generate left eye motion information based on detected left eye motion from the first eye tracker;
        generate right eye motion information based on detected right eye motion from the second eye tracker;
        determine an eye focus region of the user and depth information of the eye focus region according to the environmental image information, the left eye motion information, and the right eye motion information; and
        adjust a position of the first image position on the first display and a position of the second image on the second display according to a displacement of the eye focus region and a variation of the depth information of the eye focus region.

13. The video see-through head mounted display of claim 12, wherein the processor is further configured to set a first setting parameter when the displacement of the eye focus region is greater than a first threshold.

14. The video see-through head mounted display of claim 13, wherein the processor is further configured to obtain the first setting parameter from a mapping table according to the displacement of the eye focus region and the variation of the depth information of the eye focus region.

15. The video see-through head mounted display of claim 13, wherein the processor is further configured to adjust the position of the first image position on the first display and the position of the second image on the second display according to the first setting parameter.

16. The video see-through head mounted display of claim 12, wherein the processor is further configured to set a second parameter according to the displacement of the eye focus region and the variation of the depth information of the eye focus region, and adjust a focus of the at least one camera according to the second parameter.

17. The video see-through head mounted display of claim 12, wherein the processor is further configured to adjust a position of the first image position on the first display and a position of the second image on the second display according to an interpupillary distance defined by a distance between a pupil center of the left eye of the user and a pupil center of the right eye of the user.

18. A device, comprising:
    at least one camera configured to capture environmental image information;
    a first display configured to display a first image according to the environmental image information;
    a second display configured to display a second image according to the environmental image information; and
    a processor configured to:
        detect left eye motion of the user, and generate corresponding left eye motion information;
        detect right eye motion of the user, and generate corresponding right eye motion information;
        determine a displacement of an eye focus region of the user and a depth variance of the eye focus region according to the environmental image information, the left eye motion information, and the right eye motion information; and
        adjust a position of the first image position on the first display and a position of the second image on the second display according to the displacement of the eye focus region and the depth variance of the eye focus region.

19. The device of claim 18, wherein the processor is further configured to adjust a focus of the at least one camera according to the displacement of the eye focus region and the depth variance of the eye focus region.

20. The device of claim 18, wherein the processor is further configured to adjust a position of the first image position on the first display and a position of the second image on the second display according to an interpupillary distance defined by a distance between a pupil center of a left eye of a user and a pupil center of a right eye of a user.

* * * * *